United States Patent
Malcolm (10) Patent No.: US 7,146,638 B2
(45) Date of Patent: Dec. 5, 2006

(54) FIREWALL PROTOCOL PROVIDING ADDITIONAL INFORMATION

(75) Inventor: Jerry Walter Malcolm, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 923 days.

(21) Appl. No.: 10/185,704

(22) Filed: Jun. 27, 2002

(65) Prior Publication Data

US 2004/0003290 A1 Jan. 1, 2004

(51) Int. Cl.
 *H04L 9/00* (2006.01)
 *G06F 15/16* (2006.01)
 *G06F 21/00* (2006.01)

(52) U.S. Cl. .......................... 726/11; 709/223
(58) Field of Classification Search .............. None
 See application file for complete search history.

(56) References Cited

U.S. PATENT DOCUMENTS

| | | | |
|---|---|---|---|
| 5,958,016 A | 9/1999 | Chang et al. | |
| 5,987,611 A | 11/1999 | Freund | |
| 6,009,475 A | 12/1999 | Shrader | |
| 6,151,675 A | 11/2000 | Smith | |
| 6,167,428 A | 12/2000 | Ellis, III | |
| 6,314,351 B1 | 11/2001 | Chutorash | |
| 6,496,935 B1 * | 12/2002 | Fink et al. | 726/13 |
| 6,772,347 B1 * | 8/2004 | Xie et al. | 726/11 |
| 2001/0011294 A1 * | 8/2001 | Ellis, III | 709/201 |

FOREIGN PATENT DOCUMENTS

| | | |
|---|---|---|
| WO | WO99/32972 | 7/1999 |
| WO | WO99/51003 | 10/1999 |

OTHER PUBLICATIONS

"Simple Assured Bastion Hosts", Chris Cant & Simon Wiseman; Defence Evaluation and Research Agency; Malvern, England; pp. 24-33.

"Detecting Anomalous and Unknown Intrusions Against Programs", Anup K. Ghosh, James Wanken & Frank Charron; Reliable Software Technologies; 21515 Ridgetop Circle, Suite 250; www.rstcorp.com; 9 pages.

* cited by examiner

Primary Examiner—Christopher Revak
(74) Attorney, Agent, or Firm—Justin Dillon; Streets & Steele; Jeffrey L. Streets (57) ABSTRACT

A method and computer program product that allow a firewall program to control whether an application program is granted access to a wide area network (WAN), such as the Internet. The method allows the firewall to receive an access request definition from the application program through a well-known port. A preferred request definition comprises the application unique identifier, a destination address, the port, and a corresponding justification statement. The firewall intercepts access requests sent by the application program and identifies a matching access request definition. The firewall then prompts a user to approve or deny the request, wherein the prompt is accompanied by the justification statement from the identified access request definition. Accordingly, the user is better able to make an informed decision whether or not to grant the access request.

30 Claims, 4 Drawing Sheets

FIREWALL PROTOCOL PROVIDING ADDITIONAL INFORMATION

BACKGROUND OF THE INVENTION

1. Field of the Invention

The present invention relates generally to the field of computer security systems and, more particularly, to a firewall that regulates access and maintains security of individual computers linked to wide area networks (WAN).

2. Description of the Related Art

Personal computers were initially used primarily as stand-alone units having no direct connections to other computers or to computer networks. Exchanging data among these first computers was mainly accomplished by exchanging magnetic or optical media such as floppy disks. Over time, computer users began to connect their personal computers to other personal computers by using Local Area Networks (LAN), thereby enabling groups of computer users to share peripherals and to share data between their computers. In this environment, maintaining security and controlling the information that a personal computer user could access over the LAN was relatively simple because the overall computing environment was limited and clearly defined within the LAN.

Then came the Internet. The development of the Internet has provided personal computers, either as stand-alone units or through a Local Area Network (LAN), access to vast stores of information, typically through web "browsers", such as Microsoft's Internet Explorer® or Netscape Navigator®. Browsers and other Internet applications have the ability to access a URL (Universal Resource Locator) or "Web" site. Access to the Internet with its vast stores of information is now essential for businesses to stay competitive, for consumers to stay informed, for many people to communicate with each other through e-mail or other forms of Internet communication, and for a myriad of other reasons, including entertainment.

Unfortunately, along with the benefits of having computer access to the Internet come a variety of dangers. These dangers include, for example, attacks by perpetrators (hackers) capable of damaging the computer system or stealing data and programs, and attacks by viruses and "Trojan Horse" programs that infiltrate a computer. Additionally, legitimate applications may send personal information to marketers without the knowledge of the user. These dangers were minor and infrequent before computer users started to connect to the Internet.

The software industry has introduced many products and technologies to address these dangers in an attempt to protect computers that access the internet. The technologies and products that the software companies have introduced focus on keeping outside hackers, viruses and "Trojan Horse" programs from penetrating the computer system or network, and include, for example, proxy servers and firewalls. Firewalls are applications that intercept the data traffic at a gateway to a wide area network and check the data packets (i.e., the Internet Protocol packets, or the IP packets) for suspicious or unwanted activities. Some firewalls additionally conduct a "stateful inspection", wherein the firewall not only looks at the IP packets but also looks at the transport protocol (e.g., TCP) header and even at the application program protocols, in an attempt to better understand the exact nature of the data exchange. Proxy servers are usually combined with a firewall and function by accepting requests from the computers on the LAN. After examining these requests and determining their suitability, the proxy servers may then forward these requests to the requested Internet server or reject the request. In this manner, the user's computer never comes directly into contact with Internet servers, but instead communicates only with the proxy server that is communicating with the Internet servers.

The Internet is essentially an open network of computers and LANs. Computers within this open network communicate using multiple protocol layers. Each of the layers addresses a distinct concern of the communication process. As a core protocol of the Internet, Internet Protocol (IP) provides a layer for exchanging data packets between computers connected to the Internet, including providing data encapsulation and header formatting, data routing across the Internet, and fragmentation and reassembly. According to the protocol, data is transmitted by attaching a header with a destination address (IP address) and then transmitting the data packet from one computer to another until the data packet arrives at the desired destination. Along this journey, each computer uses an implementation of the IP Protocol to route the data packet to the next destination until the data packet reaches its final destination. Except for checking the integrity of the IP header, no error detection or recovery tasks are performed. When the data packet arrives at its ultimate destination, any necessary integrity checks are carried out.

Another protocol, the transport protocol, serves as a layer responsible for guaranteeing the integrity of application data. It is, therefore, used only at the original source and final destination of the data. The Internet currently uses two different transport protocols. One protocol, User Datagram Protocol (UDP), does not offer reliable connectionless services. Therefore, in practice it is up to the target application to check data integrity. In contrast, Transmission Control Protocol (TCP), another transport protocol, provides reliable connection-oriented service, which establishes a connection with a remote computer and guarantees data integrity and delivery (or notifies the application in case of an error).

Both TCP and UDP data transmissions provide specific headers in addition to the IP header. In order to simplify forwarding the data packets to a target application, these headers include a port number. The port number identifies an application-level protocol. Port number 80, for instance, is normally used for the World Wide Web protocol (Hypertext Transport Protocol or HTTP), and is therefore called a "well-known port number." Other well-known port numbers include, for example, port number 25 for SMTP, used to deliver email, and port number 21, used for FTP service. A server makes its services available to the Internet by using a different port number for each service that the server offers. To connect to one of the services, the computer trying to connect must include both the specific IP address of the server and the specific port address used by the server to provide the requested service.

TCP/IP refers to IP Protocol combined with TCP and UDP. Normally, application programs communicate with an available TCP/IP implementation (e.g., Windows "WinSock") through an Applications Programming Interface (API). For Windows computers, the WinSock API simply encapsulates the TCP/IP architecture. WinSock is patterned after the popular Berkeley Sockets programming model, which is generally considered the de facto standard for TCP/IP networking.

Internet applications generally implement more specialized protocols on top of TCP/IP. For example, a Web browser implements the client portions of the HyperText Transfer Protocol (HTTP) in order to communicate with Web servers. A Web browser also might implement other protocols, such as the older File Transfer Protocol (FTP) for downloading data. Electronic mail applications (i.e., E-mail clients) implement the client portion of the Simple Mail Transfer Protocol (SMTP) and the Post Office Protocol (POP). Still other protocols exist for use in the Internet, many of which are documented in the technical, trade, and patent literature. Firewalls have been developed for installation on desktop computers, whether these computers are attached to a LAN or operated as stand-alone computers. Firewall programs such as ZoneAlarm®, a registered trademark of Zone Labs, Inc., of San Francisco, Calif., or Desk Top Firewall®, a registered trademark of Symantec, Inc., of Cupertino, Calif., are installed on a desktop computer to prevent unknowing or unauthorized inbound or outbound Internet traffic with the desktop computer. When an application program running on the desktop computer attempts to access the Internet to connect to a particular server/port for the first time, the firewall program asks the user to approve or deny the access. Typically, the firewall program allows the user the option of having the firewall program create an Internet access rule based on the user's response. Once the firewall has an Internet access rule in place, usually part of a database of access rules, criteria and their conditions, then the firewall does not have to seek the user's approval each subsequent time that the application program attempts to access the particular server covered by the access rule. Similarly, when a request to access the user's computer is received from an external source over the Internet on a particular port of the user's computer, the firewall program on the computer queries the user to approve or deny access, again offering to store the answer in the form of an access rule of the firewall program if the user so chooses. Therefore, the user is allowed to provide the firewall program with instructions about how to control both Internet traffic that is inbound to the computer and Internet traffic that is outbound from the computer.

Unfortunately, when an application program requests permission to access the Internet through the firewall, a typical firewall program provides the user with insufficient information to make an informed decision. Typically, the firewall will provide only the name of the desktop application program seeking access to the Internet and the name of the remote server and port that the application program wants to access. The firewall is unable to provide the user with a reason why the application program wants to access the Internet or what information will be sent or received. While some reasons may be obvious, for example, an email organizer application requires connecting with the user's SMTP server, other reasons are not so obvious, leaving the user to guess as to whether to permit access or not. Some application programs have abused this lack of user knowledge, by collecting private information without the user's permission, and sending that information to a server without the user's knowledge or permission.

With access to the Internet being such an important and growing need for many people and businesses, computer users want to protect their computers and their privacy and still have access to the Internet. What is needed is a method that informs computer users why their applications and computers need to access the Internet before the access is provided. It would be of further benefit if the method enabled a firewall program to provide the user with enough information to make informed decisions as to whether to allow the Internet access.

SUMMARY OF THE INVENTION

The present invention provides a firewall method or protocol for controlling access or communication between an application program and a wide area network, such as the Internet. The method comprises receiving at least one access request definition from the application program through a well-known port, wherein each access request definition comprises the name or other unique identifier of the application program, a destination address on a wide area network, a port, and a corresponding justification statement. The firewall is also responsible for intercepting an access request directed from the application program to a destination address on the wide area network, identifying one of the at least one access request definitions that matches the intercepted access request, and prompting a user to approve or deny the intercepted access request accompanied by the justification statement from the identified access request definition.

In one embodiment, the firewall receives the at least one access request definition from the application program during startup of the application program. In an alternative embodiment, the firewall receives the at least one access request definition from the application immediately prior to the intercepted access request.

The intercepted access request will provide the name of the application program and a destination address on the wide area network address. The justification statement originating from the application program comprises parameters selected from the name of the application program, the version of the application program, the destination address on the wide area network address, an entity responsible for a server at the destination address, a text string detailing a purpose for the access request, information to be delivered to the server at the destination address, information to be received from the server at the destination address, and combinations thereof.

After informing the user about the access request, the firewall receives a user response indicating approval or denial of the intercepted access request. Furthermore, the firewall program may maintain an access rule data structure and prompt the user to provide an instruction whether to apply the user response against subsequent access requests matching the identified access request definition. If the user desires to apply the response to subsequent access requests, the firewall may store an access rule in the access rule data structure in accordance with the user instruction. Access rules comprise three parameters: application name, destination address or URL, and port, as well as an instruction to accept or deny the access. When a request matches the application name, destination address or URL, and the port stored in one of these rules, the firewall executes the associated instruction to accept or deny the access. If a request does not match one of the rules, then the firewall asks the user for permission to grant the access and provides the justification statement. When an access request is approved, either by an access rule or by the user response, the firewall passes the approved access requests to the wide area network.

The present invention also provides a computer program product to control access by an application program to a wide area network. The computer program product comprises receiving instructions for receiving at least one access request definition from the application program through a well-known port, wherein each access request definition comprises the name of the application program, a destination address on a wide area network, the port, and a corresponding justification statement; intercepting instructions for intercepting an access request directed from the application program to a destination address on the wide area network; identifying instructions for identifying one of the at least one access request definitions that matches the intercepted access request; and prompting instructions for prompting a user to approve or deny the intercepted access request accompanied by the justification statement from the identified access request definition. The computer program product will typically further comprise receiving instructions for receiving a user response indicating approval or denial of the intercepted access request.

Optionally, the computer program product will also include maintaining instructions for maintaining an access rule data structure, and prompting instructions for prompting the user to provide an instruction whether to apply the user response against subsequent access requests matching the identified access request definition. Preferably, the computer program product will comprise storing instructions for storing an access rule in the access rule data structure in accordance with the user instruction. Upon executing receiving instructions for receiving a subsequent access request matching the stored access rule, the computer program product will preferably execute searching instructions for searching an access rule data structure for an access rule covering the access request and automatic instructions for automatically approving or denying the subsequent access request in accordance with the stored access rule. Finally, the product comprises passing instructions for passing approved access requests to the wide area network.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The present invention provides a method and computer program product that allow a firewall program to control whether an application program is granted access to a wide area network (WAN), such as the Internet. The method of the present invention allows the firewall to receive at least one access request definition from the application program, preferably, though not required, through a well-known port. A preferred request definition comprises the name of the application program, a destination address on a wide area network, the port, and a corresponding justification statement. The firewall intercepts access requests that are directed from the application program to a destination address on the wide area network and identifies one of the at least one access request definitions that match the intercepted access request. The firewall then prompts a user to approve or deny the intercepted access request accompanied by the justification statement from the identified access request definition. When the computer user views, hears or otherwise receives the justification statement explaining why the application program needs to access the wide area network, the user is better able to make an informed decision whether or not to grant the access request.

When the user makes the decision whether or not to grant access to the Internet based upon the displayed justification statement, the user may also indicate whether to grant the particular access request this one time, grant the particular access request at all subsequent times, deny the particular access request this one time, or deny the particular access request at all subsequent times. If the user elects to form an access rule applicable to subsequent access requests, the decision to grant or deny access may then be stored in a database or similar record management system so that the next time the particular access request is made, the firewall may grant or deny access based upon the user's previous instructions. Alternatively, the user may continue to instruct the firewall to grant or deny the application access to the Internet on a case-by-case basis.

Preferably, the firewall communicates the justification statement through a dialogue box or other suitable communications interface to inform the user about the type and purpose of the requested Internet access. For example, the dialogue box may display a statement that:

"Application XYZ is attempting to contact URL www.xyz.com for the purpose of checking if a new version of the application is available. Do you approve this access?"

In response to this request, the user may indicate, for example by clicking a mouse button over a check box that the user approves or denies the access.

The method of the present invention requires an application program to provide the firewall with the URL of the server on the Internet and the purpose for making the contact, preferably including the information that will be sent and/or received. For example, if an application program wants to send banking information to the user's broker, the user must approve the request before the information can be exchanged. Alternatively, the user may deny the access.

Specifically, the application program will preferably provide the firewall program with a list of Internet access requests that the application may possibly have during execution of the application. For example, each record in the list of possible Internet access requests may include parameters selected from the name of the application, the version of the application, a name of the external server to contact, an entity name responsible for the server, a justification statement detailing the purpose for contacting the server, information to be delivered to the server, information to be received from the server, and combinations thereof.

When the firewall intercepts a standard Internet access request from the application, any or all of these parameters maybe communicated to the user as part of or along with the justification statement. The means of communicating these parameters from the computer to the user may include any known means, such as by displaying the information on a computer monitor or playing audio over a set of speakers.

Not all application programs may be willing or able to provide this additional information to the firewall program and, ultimately, to the user. In that case, the user may associate a higher level of risk to those application programs not willing or able to provide the additional information, since these programs may conceivably be less than completely forthright in stating their purpose for contacting a particular server. The present invention does not address the issue of an application program that provides overtly incorrect information to the user. However, such a problem would ultimately be detected, thereby discrediting both the application program and the application program's marketer for providing false information to the users.

It is preferred that the application program send information to the firewall during startup of the application, wherein the information includes possible types of Internet access requests and associated justification statements for each type or request. However, it is also within the scope of the present invention that the application may send this information to the firewall immediately preceding each standard Internet request.

It should be noted that some computers reside on a Local Area Network (LAN) having access to the Internet only through a separate server that also resides on the LAN. The separate server may have a firewall that protects the entire LAN from the dangers associated with accessing the Internet. The present invention is equally applicable to those computers having a firewall for protection that is located on a separate device residing on the same LAN.

Regardless of the exact location of the firewall program, an access rule may be created at the discretion of the user to control the particular Internet access request in the same manner whenever subsequently requested by the application program. The access rules maybe stored in a database or other suitable record management system or data structure associated with the firewall program. Access rules comprise three parameters, an application name or other unique identification, a destination address or URL and a port, and one instruction to accept or deny the access. When a request matches the application name, destination address or URL, and the port stored in one of these rules, the firewall executes the associated instruction to accept or deny the access. If a request does not have parameters that match one of the rules, then the firewall asks the user for permission to grant the access and provides the justification statement. Parameters contained within the request to access the Internet are compared with the parameter of the access rules to determine whether an identical access request was granted in the past and granted for all subsequent access requests containing the same parameters.

Establishing communications between the application program and the firewall, so that the firewall may inquire of the user whether to allow the application program to obtain Internet access, may be achieved by methods well known to those having ordinary skill in the art and will not be discussed in detail herein. One acceptable method may be that the firewall opens a well-known port for the purpose of communicating with all the application programs running on the desktop computer that may request Internet access. The operating system may create a socket and bind the socket to the well-known port and the firewall may then listen on the socket for communications from application programs. When an application program is started, the application program may create a socket for communicating with the firewall program. The application program may then communicate with the firewall program using standard socket protocol thereby sending and receiving communications to and from the well-known port of the firewall. In the preferred embodiment, communication between the firewall and the application program would be through XML-based messages, using an industry-accepted standard XML grammar designed for communicating between the firewall and application programs. XML is short for Extensible Markup Language, a specification developed by the World Wide Web Consortium, an international consortium of companies involved with the Internet. XML is a language designed especially for Web documents allowing customized tags that enable the definition, transmission, validation, and interpretation of data between applications and between organizations. However, any alternative means for communicating would be acceptable.

The present invention may be run on a variety of computers under a number of different operating systems. The computer could be, for example, a personal computer, a mini computer, personal digital assistant, mainframe computer or a computer running in a distributed network of other computers. Although the specific choice of computer is limited only by processor speed and disk storage requirements, computers in the IBM PC series of computers could be used in the present invention. One operating system that an IBM personal computer may run is IBM's OS/2 Warp 4.0. In the alternative, the computer system might be in the IBM RISC System/6000 (™) line of computers that run on the AIX (™) operating system.

Figure 1:
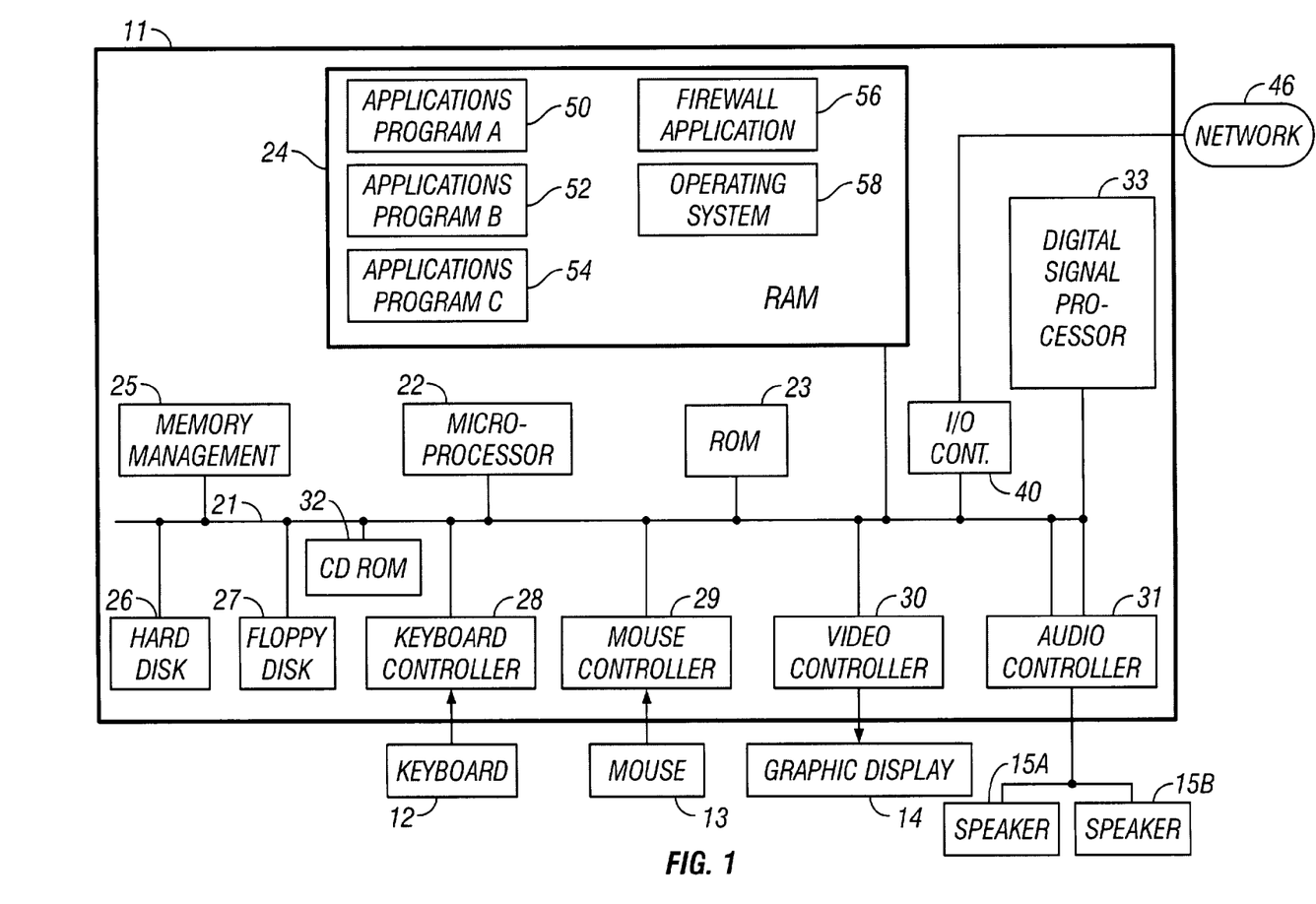
FIG. 1 is a block diagram of an exemplary computer upon which the present invention may be implemented.

FIG. 1 is a block diagram of an exemplary computer upon which the present invention may be implemented. The computer comprises a system unit 11, a keyboard 12, a mouse 13 and a display 14. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24, also connected to the system bus 21. A suitable microprocessor available in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips may be used in the specific computer.

The ROM 23 contains among other code the Basic Input-Output System (BIOS) that controls basic hardware operations such as the interaction of the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32, also coupled to the system bus 21, is capable of storing a large amount of data, e.g., a multimedia program or presentation and application programs.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40, such as a Token Ring Adapter, enables communication over a network 46 to other similarly configured data processing systems.

An operating system 58, firewall program 56, and application programs 50, 52, 54 are resident in the random access memory 24 when loaded from the hard disk 26 for use. Until required by the computer system, these programs may be stored in another computer memory, for example, in the hard disk drive 26, or in a removable memory such as an optical disk for eventual use in the CD-ROM 32 or in a floppy disk for eventual use in the floppy disk drive 27. The program may also be stored in the memory of another computer system to be sent over the network or an external network such as the Internet when desired. One skilled in the art will appreciate that the physical storage of the sets of instructions physically changes the medium upon which it is stored or transmitted electrically, magnetically, or chemically so that the medium carries computer readable information. While it is convenient to describe the invention in terms of instructions, symbols, characters, or the like, it should be remembered that all of these and similar terms should be associated with the appropriate physical elements.

Figure 2A:
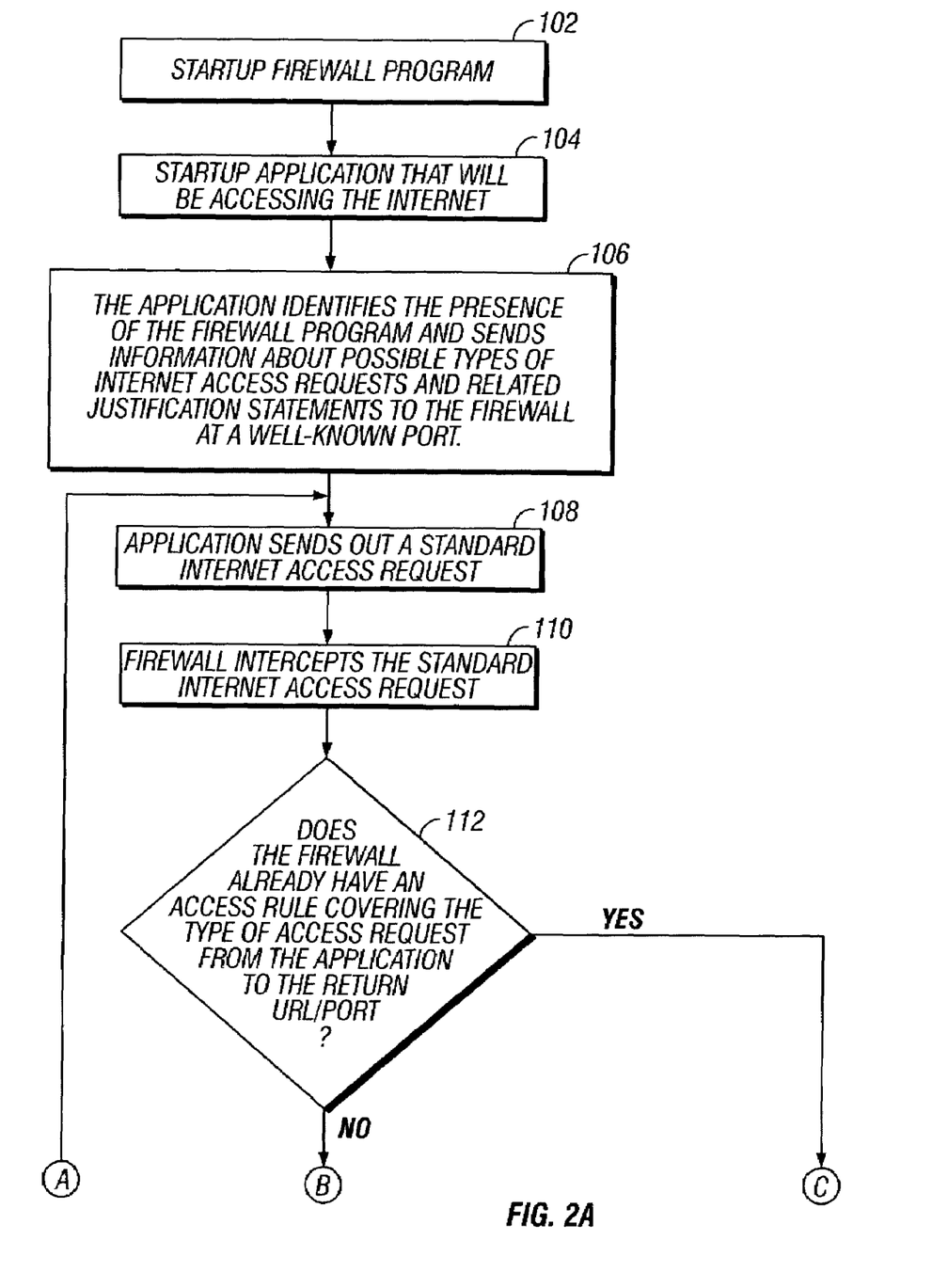
FIGS. 2A–B are a flowchart of a method for controlling an application program's access to the Internet on a computer with a firewall in accordance with the present invention.
Figure 2B:
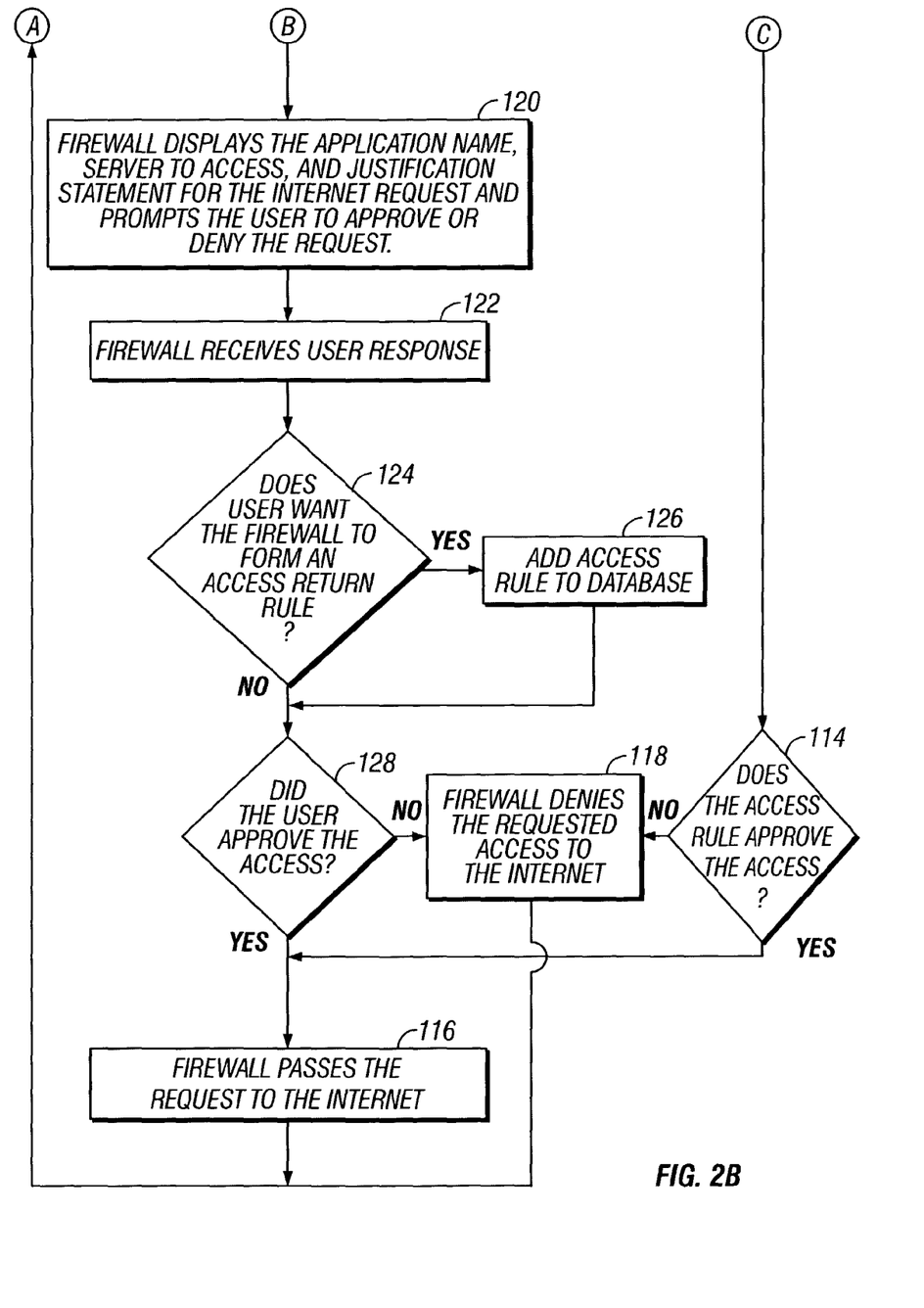

The firewall program 56 provides the computer with a virtual firewall between the desktop computer or server and the external, unsecured network of the Internet. Additionally, the firewall implements filter rules approved by the user to decide which IP packets should be permitted to pass through the firewall. The user may define access rules based on a number of characteristics to govern the passage of IP packets through the firewall passing either to or from the Internet. For example, the user can deny access of all IP packets with a particular destination address or the user can permit all IP packets that arrive from a specified source address and port number. FIGS. 2A–B are a flowchart of a preferred method that allows a computer with a firewall program to control the access that an application program has to the Internet. State 102 requires startup of the firewall program. In state 104, an application program is started that requires at least occasional access to the Internet. In state 106, the application program identifies the presence of the firewall program and sends information about all possible types of Internet access requests and related justification statements to the firewall at a pre-determined well-known port. In state 108, the application sends out a standard Internet access request and, in state 110, the firewall program intercepts the Internet access request.

In state 112, the firewall program accesses its access rules data structure and determines whether there is already an access rule covering the type of access request received from the application and directed to the destination address or URL and port. If it is determined that an access rule covers the access request, then, continuing to FIG. 2B, in state 114 the firewall determines whether the relevant access rule approves or denies the access request. If the access rule approves the access request, then in state 116 the firewall passes the request to the Internet. On the other hand, if the access rule denies the access request, then in state 118 the firewall denies or ignores the request to access the Internet. From either state 116 or state 118, the method returns to state 108 to wait for the application to send a subsequent Internet access request.

Returning to state 112, if the firewall program determines that it does not have an access rule covering the intercepted Internet access request, then in state 120, the firewall program displays the application program name, the destination server, and a justification statement detailing the reason for accessing the destination server, and prompts the user to approve or deny the intercepted Internet access request. It should be emphasized that the justification statement displayed in state 120 was provided to the firewall by the application in state 106. In state 122, the firewall program receives a user response that approves or denied the Internet access request. In state 124, the firewall program queries whether the user would like the firewall program to apply that decision, either approval or denial, to subsequent identical Internet access requests without prompting the user for permission. If the user wants to form a rule, then in state 126, a new access rule is added to the access rule data structure. If the user does not want to form a rule, as determined in state 124, or an access rule has already been formed in state 126, then the method continues to state 128. If the user response received in state 122 approved the intercepted Internet access request, then the firewall passes the request to the Internet in state 116. Alternatively, if the user response received in state 122 denied the intercepted Internet access request, then the firewall denied the requested access to the Internet in state 118. As stated earlier, the method proceeds from either state 116 or state 118 to state 108 to wait for the application to send a subsequent Internet access request.

Figure 3:
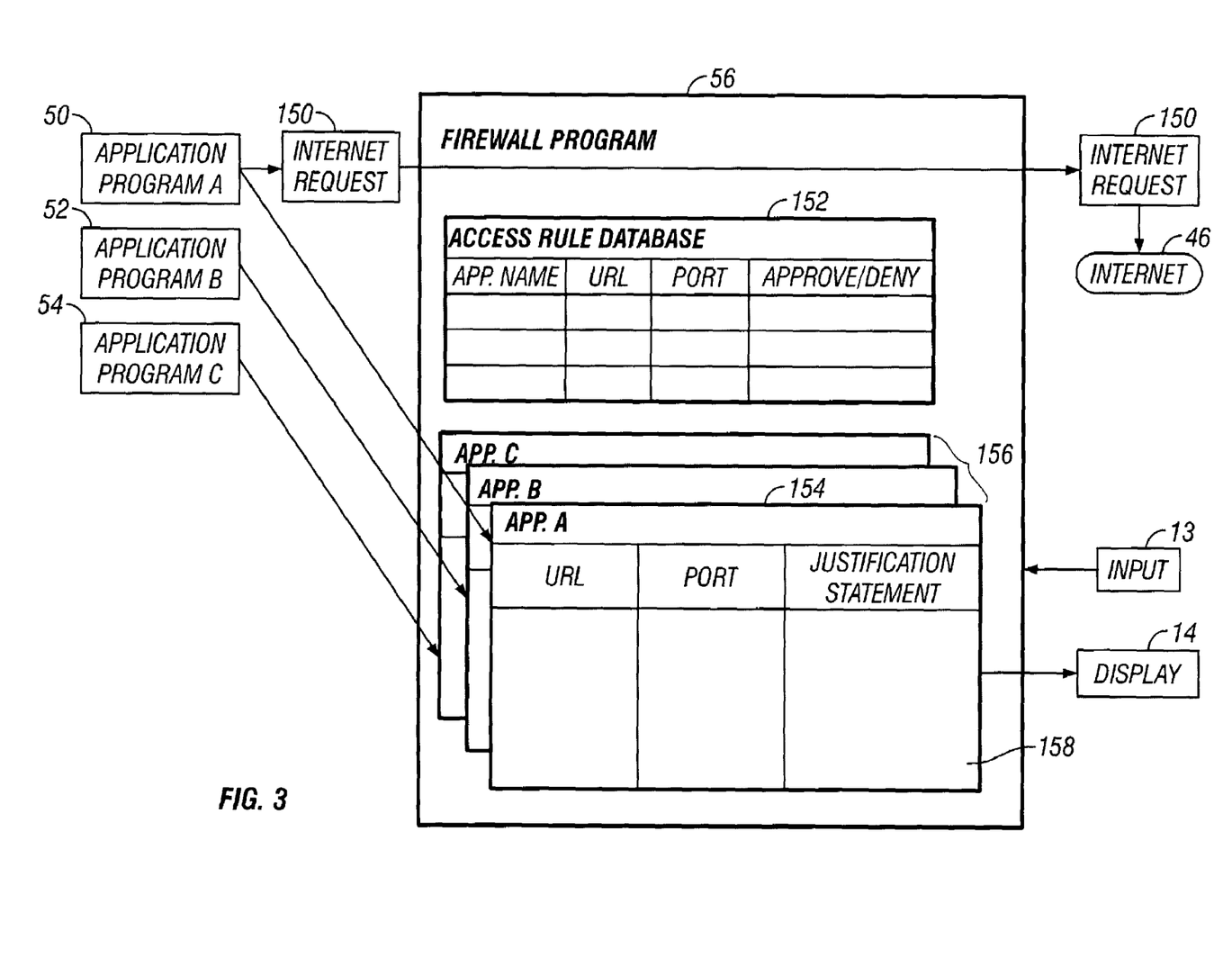
FIG. 3 is a data flow diagram illustrating the method of FIGS. 2A–B.

FIG. 3 is a data flow diagram illustrating the method of FIGS. 2A–B and showing more detail about the application programs 50, 52, 54 and the firewall program 56. The firewall program 56 is loaded into RAM 24 (See FIG. 1), preferably during startup of the computer 11. As Application Programs A, B and C are initiated, the programs send information about possible Internet access requests to the firewall program 56, preferably for storage in records 154 of a data structure 156. When an application program sends out a standard Internet access request, such as Application A 50 sending out Internet access request 150, then the firewall program 56 intercepts the request 150 applies any access rules in the access rules database 152 having parameters that match the request 150. If no access rules apply to the request, then the firewall determines the record 154 of data structure 156 that corresponds to the request 150 and sends relevant information from the record 154, including the justification statement 158, to the display 14 or other communication device. The firewall receives a user response input through a mouse 13 or other input device. Accordingly, if the request 150 is approved either by an access rule or by the user response, then the Internet request 150 is passed on to the Internet 46.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for a firewall program to control communication between an application program and a wide area network, comprising:
    receiving at least one access request definition from the application program, wherein each access request definition comprises a unique identifier of the application program, a destination address on a wide area network, a port, and a corresponding justification statement;
    intercepting an access request directed from the application program to a destination address on the wide area network;
    identifying one of the at least one access request definitions that matches the intercepted access request; and
    prompting a user to approve or deny the intercepted access request accompanied by the justification statement from the identified access request definition.

2. The method of claim 1, wherein the wide area network is the Internet.

3. The method of claim 1, wherein the at least one access request definition is received on a well-known port.

4. The method of claim 1, wherein the at least one access request definition is received from the application program during startup of the application program.

5. The method of claim 1, wherein the at least one access request definition is received by the firewall preceding the intercepted access request.

6. The method of claim 1, wherein the justification statement comprises parameters selected from the unique identifier of the application program, the version of the application program, the destination address on the wide area network address, an entity responsible for a server at the destination address, a text string detailing a purpose for the access request, information to be delivered to the server at the destination address, information to be received from the server at the destination address, and combinations thereof.

7. The method of claim 1, wherein the intercepted access request comprises the unique identifier of the application program and a destination address on the wide area network address.

8. The method of claim 1, further comprising:
receiving a user response indicating approval or denial of the intercepted access request.

9. The method of claim 8, further comprising:
maintaining an access rule data structure; and
prompting the user to provide an instruction whether to apply the user response against subsequent access requests matching the identified access request definition.

10. The method of claim 9, further comprising:
storing an access rule in the access rule data structure in accordance with the user instruction.

11. The method of claim 10, wherein the access rules comprise parameters selected from unique identifiers of approved applications, unique identifiers of unapproved applications, approved versions of the application program, unapproved versions of the application program, names of acceptable destination addresses on the wide area network, names of unacceptable destination addresses on the wide area network, and combinations thereof.

12. The method of claim 1, further comprising:
searching an access rule data structure for an access rule covering the access request.

13. The method of claim 10, further comprising:
receiving a subsequent access request matching the stored access rule;
automatically approving or denying the subsequent access request in accordance with the stored access rule.

14. The method of claim 13, wherein an access request matches the stored access rule when the access request contains at least one parameter in common with the stored access rule, wherein the at least one parameter is selected from unique identifiers of approved applications, unique identifiers of unapproved applications, approved versions of the application program, unapproved versions of the application program, names of acceptable destination addresses on the wide area network, names of unacceptable destination addresses on the wide area network, and combinations thereof.

15. The method of claim 1, further comprising:
passing approved access requests to the wide area network.

16. A computer program product including instructions embodied on a computer readable storage medium, the computer program product acting as a firewall to control access by an application program to a wide area network, comprising:

receiving instructions for receiving at least one access request definition from the application program, wherein each access request definition comprises a unique identification of the application program, a destination address on a wide area network, a port, and a corresponding justification statement;
intercepting instructions for intercepting an access request directed from the application program to a destination address on the wide area network;
identifying instructions for identifying one of the at least one access request definitions that matches the intercepted access request; and
prompting instructions for prompting a user to approve or deny the intercepted access request accompanied by the justification statement from the identified access request definition.

17. The computer program product of claim 16, wherein the wide area network is the Internet.

18. The computer program product of claim 16, wherein the at least one access request definition is received on a well-known port.

19. The computer program product of claim 16, wherein the at least one access request definition is received from the application program during startup of the application program.

20. The computer program product of claim 16, wherein the at least one access request definition is received by the firewall preceding the intercepted access request.

21. The computer program product of claim 16, wherein the justification statement comprises parameters selected from the unique identifier of the application program, the version of the application program, the destination address on the wide area network address, an entity responsible for a server at the destination address, a text string detailing a purpose for the access request, information to be delivered to the server at the destination address, information to be received from the server at the destination address, and combinations thereof.

22. The computer program product of claim 16, wherein the intercepted access request comprises the unique identifier of the application program and a destination address on the wide area network address.

23. The computer program product of claim 16, further comprising:
receiving instructions for receiving a user response indicating approval or denial of the intercepted access request.

24. The computer program product of claim 23, further comprising:
maintaining instructions for maintaining an access rule data structure; and
prompting instructions for prompting the user to provide an instruction whether to apply the user response against subsequent access requests matching the identified access request definition.

25. The computer program product of claim 24, further comprising:
storing instructions for storing an access rule in the access rule data structure in accordance with the user instruction.

26. The computer program product of claim 25, wherein the access rules comprise parameters selected from unique identifiers of approved applications, unique identifiers of unapproved applications, approved versions of the application program, unapproved versions of the application program, names of acceptable destination addresses on the wide area network, names of unacceptable destination addresses on the wide area network, and combinations thereof.

27. The computer program product of claim 16, further comprising:
   searching instructions for searching an access rule data structure for an access rule covering the access request.

28. The computer program product of claim 25, further comprising:
   receiving instructions for receiving a subsequent access request matching the stored access rule; and
   automatic instructions for automatically approving or denying the subsequent access request in accordance with the stored access rule.

29. The computer program product of claim 28, wherein an access request matches the stored access rule when the access request contains at least one parameter in common with the stored access rule, wherein the at least one parameter is selected from unique identifiers of approved applications, unique identifiers of unapproved applications, approved versions of the application program, unapproved versions of the application program, names of acceptable destination addresses on the wide area network, names of unacceptable destination addresses on the wide area network, and combinations thereof.

30. The computer program product of claim 16, further comprising:
   passing instructions for passing approved access requests to the wide area network.

* * * * *